(12) United States Patent
Steenhof et al.

(10) Patent No.: US 8,613,248 B2
(45) Date of Patent: *Dec. 24, 2013

(54) METHOD AND APPARATUS FOR PREPARING A BEVERAGE SUITABLE FOR CONSUMPTION

(75) Inventors: Vincent Jan Steenhof, 's Hertogenbosch (NL); Joseph Theodoor Knitel, De Meern (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/305,447

(22) Filed: Nov. 28, 2011

(65) Prior Publication Data

US 2012/0260807 A1 Oct. 18, 2012

Related U.S. Application Data

(63) Continuation of application No. 11/814,895, filed as application No. PCT/NL2006/000045 on Jan. 26, 2006, now Pat. No. 8,071,147.

(30) Foreign Application Priority Data

Jan. 27, 2005 (NL) ...................................... 1028133

(51) Int. Cl.
*A47J 31/06* (2006.01)
*A47J 31/02* (2006.01)

(52) U.S. Cl.
USPC .................................. 99/291; 99/295; 99/306

(58) Field of Classification Search
USPC ............ 99/295, 306, 307, 291, 305; 426/433, 426/78, 79
See application file for complete search history.

(56) References Cited

U.S. PATENT DOCUMENTS 2,968,560 A 1/1961 Goros
3,425,339 A 2/1969 Fleischman et al.
(Continued)

FOREIGN PATENT DOCUMENTS

DE 19719784 C1 7/1998
EP 0209937 B1 6/1990
(Continued)

OTHER PUBLICATIONS

"Douwe EUGHberts Don't Buy This." Douwe Egberts Instant Mocha Cofe—Product Information Ciao! From bing™, http://www.ciao.co.uk/Douwe_Egberts_Instant_Mocha_Coffee_Review_5355952, Oct. 1, 2002.

(Continued)

*Primary Examiner* — Reginald L Alexander
(74) *Attorney, Agent, or Firm* — Foley & Lardner LLP (57) ABSTRACT

The invention relates to a method and an apparatus (1) for preparing a beverage suitable for consumption from at least two ingredients and an amount of liquid such as water which is supplied to the ingredients, wherein a first ingredient comprises a substance to be extracted such as ground coffee, and a second ingredient comprises a substance such as milk powder/creamer, sugar and such additives, soluble in liquid such as water. During a first period, the liquid having, at most, a first temperature, is supplied to the first and second ingredient for obtaining a first beverage part, and, during a second period, the liquid having, at least, a second temperature is supplied to the first and second ingredient for obtaining a second beverage part. The first and second beverage parts are combined for obtaining the beverage.

21 Claims, 5 Drawing Sheets

(56) References Cited

U.S. PATENT DOCUMENTS

| | | | |
|---|---|---|---|
| 3,587,444 A | 6/1971 | Godel | |
| 4,147,097 A | 4/1979 | Gregg | |
| 4,158,067 A | 6/1979 | Wouda | |
| 4,518,105 A | 5/1985 | Kuckens et al. | |
| 4,718,579 A | 1/1988 | Brody et al. | |
| 4,791,860 A | 12/1988 | Verheijen | |
| 5,014,611 A | 5/1991 | Illy et al. | |
| 5,186,096 A * | 2/1993 | Willi | 99/282 |
| 5,242,702 A | 9/1993 | Fond | |
| 5,724,883 A | 3/1998 | Usherovich | |
| 5,842,603 A | 12/1998 | Schroeder et al. | |
| 5,858,437 A * | 1/1999 | Anson | 426/431 |
| 5,882,716 A | 3/1999 | Munz-Schaerer et al. | |
| 5,895,672 A | 4/1999 | Cooper | |
| 6,019,032 A | 2/2000 | Arksey | |
| 6,021,705 A | 2/2000 | Dijs | |
| 6,079,315 A | 6/2000 | Beaulieu et al. | |
| 6,082,245 A | 7/2000 | Nicolai | |
| 6,460,735 B1 | 10/2002 | Greenwald et al. | |
| 6,499,389 B1 | 12/2002 | Probst | |
| 6,764,704 B2 | 7/2004 | Schub | |
| 6,990,891 B2 * | 1/2006 | Tebo, Jr. | 99/295 |
| 7,093,533 B2 | 8/2006 | Tebo, Jr. et al. | |
| 7,325,479 B2 | 2/2008 | Laigneau et al. | |
| 7,350,457 B2 | 4/2008 | Wessels et al. | |
| 7,594,470 B2 * | 9/2009 | Scarchilli et al. | 99/295 |
| 7,650,831 B2 | 1/2010 | Denisart et al. | |
| 7,748,311 B2 | 7/2010 | Brouwer et al. | |
| 2002/0088807 A1 | 7/2002 | Perkovic et al. | |
| 2003/0005826 A1* | 1/2003 | Sargent et al. | 99/279 |
| 2004/0005384 A1* | 1/2004 | Cai | 426/77 |
| 2005/0076784 A1 | 4/2005 | Tebo, Jr. et al. | |
| 2008/0105130 A1 | 5/2008 | Koeling et al. | |
| 2008/0148958 A1 | 6/2008 | Koeling et al. | |
| 2009/0272274 A1 | 11/2009 | De Graaff et al. | |

FOREIGN PATENT DOCUMENTS

| | | |
|---|---|---|
| EP | 0756844 B1 | 6/1999 |
| EP | 1101430 A1 | 5/2001 |
| EP | 0904719 B1 | 8/2003 |
| EP | 1510160 | 3/2005 |
| EP | 1848310 B1 | 11/2009 |
| FR | 2 842 090 | 1/2004 |
| FR | 2 842 092 | 1/2004 |
| JP | 62-268513 | 11/1987 |
| JP | 5151449 | 6/1993 |
| JP | 10222748 | 8/1998 |
| JP | 2004-528143 | 9/2004 |
| NL | 1020833 | 12/2003 |
| WO | WO 96/36557 | 11/1996 |
| WO | WO 00/32291 | 6/2000 |
| WO | WO 02/28241 A1 | 4/2002 |
| WO | WO 2005/105609 A2 | 11/2005 |
| WO | WO 2005/105609 A3 | 11/2005 |
| WO | WO 2005/122851 A1 | 12/2005 |
| WO | WO 2006/003565 A1 | 1/2006 |
| WO | WO 2006/043808 A2 | 4/2006 |
| WO | WO 2006/043808 A3 | 4/2006 |

OTHER PUBLICATIONS

Notice of Opposition to a European Patent for European Patent No. 1 848 310, filed Aug. 17, 2011.

* cited by examiner

METHOD AND APPARATUS FOR PREPARING A BEVERAGE SUITABLE FOR CONSUMPTION

The invention relates to a method for preparing a beverage suitable for consumption from at least two ingredients and an amount of liquid such as water which is supplied to the ingredients, wherein a first ingredient comprises a substance to be extracted or to be dissolved with a liquid, and a second ingredient comprises a substance to be extracted or to be dissolved with a liquid.

The invention also relates to an apparatus for preparing a beverage suitable for consumption from at least two ingredients and an amount of liquid such as water which is supplied to the ingredients, wherein a first ingredient comprises a substance to be extracted or to be dissolved and a second ingredient comprises a substance to be extracted or to be dissolved;

the apparatus being provided with at least one holder system for receiving the first and second ingredient, the holder system being provided with at least one inflow opening and at least one outflow opening and liquid supply means for during use, supplying a liquid to the at least one inflow opening of the holder system.

Such a method is known from the international patent application WO04/018326. Here, the first ingredient comprises, for instance, a substance to be extracted such as ground coffee and the second ingredient comprises a substance to be dissolved such as milk powder/creamer and the like. The first ingredient may be included in a first compartment formed by a covering which is manufactured, at least substantially, from a sheet-shaped material such as filtering paper. The second ingredient is included in the second compartment which is also at least substantially formed by a covering manufactured from a sheet-shaped material such as filtering paper. The first and second covering can then be fixedly interconnected and form one whole. In use, the hot water first flows, for instance, through the first compartment so that a coffee extract is formed, whereupon the hot water with the coffee particles therein flows through the second compartment so that the soluble substance dissolves. The ready beverage then leaves the second covering. Thereupon, in a known manner, air can then be whipped into the ready beverage so that coffee with a fine-bubble froth layer is formed. A drawback of the known method is that the fine-bubble froth layer has a brown color. The fact is that when the hot water flows through the covering, both coffee particles and dissolved particles of the second ingredient are taken up in the hot water.

The object of the invention is to provide a method wherein it is possible to obtain a ready beverage, with, for instance, frothed milk floating on a coffee extract, so that a real cappuccino is obtained. More in general, the invention has for an object to provide a method wherein the first and the second ingredient dissolve in the liquid and/or are extracted in a manner such that the first and second ingredient do not dissolve and/or are extracted simultaneously, and also in a manner such that the first and second ingredient are dissolved and/or extracted at least partly independently of each other.

To that end, the method according to the invention is characterized in that the method comprises the steps of:

supplying, during an at least first period, to the first and second ingredients the liquid having, at most, a first temperature for obtaining a first beverage part, supplying, during an at least second period, to the first and second ingredients, the liquid having, at least, a second temperature for obtaining a second beverage part;

combining the first and the second beverage parts for obtaining the beverage; and selecting the first and second ingredients and the first and second temperatures in a manner such that during the first period, the first ingredient dissolves or is extracted to a greater or smaller extent than during the second period, and/or that during the first period, the second ingredient dissolves or is extracted to a greater or smaller extent than during the second period, so that the first and second beverage parts differ from each other.

It appears that with the features according to the invention, that is, supplying to the first and second ingredient the liquid having, at most, the first temperature during a first period, and supplying to the first and second ingredient the liquid having, at least, the second temperature during the second period, it is possible in a simple manner, to render independent of each other the points in time at which the two ingredients dissolve and/or extract and/or the extent to which the two ingredients dissolve and/or extract.

Thus, a first beverage part can be obtained which differs from the second beverage part. This offers the possibility, utilizing the fact that the first beverage part differs from the second beverage part, to then obtain, when combining the first and second beverage parts, a beverage with desired properties. The quantities of the first and second beverage parts can, for instance, be varied by varying the length of the first and second period. If, subsequently, the first and second beverage parts are combined to form a ready beverage, the flavour and/or appearance of the beverage will depend on the amount of first and second beverage part. The first and second beverage parts may be combined such that they mix well. However, it is also possible that the first and second beverage parts are combined such that they do not mix well so that a beverage is obtained in which the first and second beverage part remain separated from each other, at least to large extent. Here, for instance, a cappuccino where milk is present on top of the coffee extract can be considered.

A possible example is the following. The substance to be extracted comprises ground coffee. The first temperature is selected such that when a liquid having, at most, the first temperature is supplied to the first and second ingredient, the first ingredient does, at least substantially, not extract. The second temperature is also selected such that when the liquid having a temperature higher than the second temperature is supplied to the first and second ingredient, the first ingredient is extracted. Further, as second ingredient, a milk powder/creamer is selected having as a property that this dissolves in the liquid when the temperature of the liquid is lower than the first temperature and when the temperature is higher than the second temperature. When, subsequently, the first period is earlier than the second period, this results in the first ingredient not being extracted during the first period while the second ingredient does dissolve. Here, the first beverage part consists of milk when the liquid consists of water. Further, the first period can be selected to be so long that at the end of the first period, the second ingredient has dissolved at least virtually completely. Then, during the second period, the first ingredient is extracted. The second beverage part will then consist virtually only of coffee extract. If, during the second period, a further portion of the second ingredient will also dissolve, in fact, coffee extract is obtained with some milk added thereto.

When, thereupon, in a known manner, air is whipped into the first beverage part, frothed milk is obtained. Also, the second ingredient may further be provided with a substance that, together with a liquid such as water, generates froth. The frothed milk can for instance be supplied to a mug. When, to the frothed milk, the second beverage part in the form of the coffee extract is added, the frothed milk will float on the coffee extract and an attractive cappuccino is obtained with a white froth layer of milk. However, it is also possible not to whip air into the first beverage part. In that case, when they are combined in a container, the first and second beverage parts will mix at least virtually completely. Then, ordinary coffee with milk is obtained. However, by varying the length of the first and second period, the amount of coffee extract in the beverage may be varied.

In the above-mentioned example, the first ingredient had as properties that extraction takes place only when the liquid has a temperature that is higher than the second temperature. In fact, dissolution of the second ingredient in the liquid takes place at any temperature. Other variations however are conceivable. It is, for instance, also possible that the first ingredient is extracted only when the temperature is lower than the minimum second temperature while the second ingredient dissolves at any temperature. It is also possible that a second ingredient dissolves only when the temperature of the liquid is lower than the maximum first temperature or dissolves only when the temperature of the liquid is higher than the minimum second temperature. In the latter two cases, the first ingredient can be extracted at a random temperature. The difference between the first and second beverages parts is then obtained on the basis of the fact that the second ingredient dissolves to a greater or lesser extent depending on the temperature. Then, the first and second beverage parts can be combined in different manners for obtaining the beverage. Here, again, air can be whipped into one of the two beverage parts so that this beverage part floats on the other beverage part. Generally, air can also be whipped into both beverage parts. It is also possible that no air at all is whipped in, whereby the two beverage parts mix while also, the compositions of the beverage from the first and second beverage parts can be varied by varying the first and second period. Preferably, it therefore applies that the first ingredient comprises a substance to be extracted in the liquid, such as ground coffee, and the second ingredient comprises a substance such as milk powder/creamer, sugar and such additives to be dissolved in the liquid.

It is preferred that the first temperature be lower than the second temperature. This offers the advantage that the liquid having, at most, the first temperature has, at all times, a lower temperature than the liquid having, at least, the second temperature. As a result, dissolution and extraction of the two ingredients is separated even better in the first and the second period.

Preferably, the first period is earlier than the second period. This entails that first, the liquid having, at most, the first temperature and then the liquid having, at least, the second temperature are supplied to the ingredients. This has as an advantage that the temperature of the liquid which is in contact with the first and second ingredient during the first period, is substantially determined by the temperature of the liquid which is supplied to the first and second ingredient. If the second period were earlier than the first period, as a result of the relatively hot liquid which is supplied during the second period to the first ingredient and the second ingredient, the temperature of the first and second ingredient is already high. And this also applies to an optional holder, or holders in which these ingredients are included. When, thereupon, during the first period, the liquid having, at most, the first temperature is supplied to the first and second ingredient, cooling will be involved which may last some time.

Preferably, it applies that the first temperature is selected such that during the first period, the first ingredient is at least virtually not extractable with the liquid and that the second temperature is selected such that during the second period the first ingredient is extractable with the liquid.

It further preferably applies that the first temperature is selected such that at least during the first period, the second ingredient is soluble in the liquid.

The obtained beverage will have a temperature which depends on the amount and the temperature of the liquid having, at most, the first temperature and the amount and the temperature of the liquid having, at least, the second temperature. Preferably, the first temperature and the second temperature are selected such that the beverage suitable for consumption has a predetermined temperature. This offers the advantage that the obtained beverage can have a temperature which is suitable or pleasant for consumption.

It is preferred that the first ingredient is included in a first pouch while the first pouch comprises a covering of a sheet-shaped material such as filtering paper, transmissive to the liquid and forming a barrier to the first ingredient, and that the second ingredient is included in a second pouch while the second pouch comprises a covering of a sheet-shaped material such as filtering paper, transmissive to the liquid and forming a barrier to the second ingredient. Preferably, the first pouch and the second pouch are placed in a holder system, the holder system being provided with at least one inflow opening and at least one outflow opening and a liquid flow path extending from the at least one inflow opening to the at least one outflow opening while, in use, the liquid is supplied to the at least one inflow opening for flowing through the first and the second pouch, while the first and second beverage part leave the holder system via the at least one outflow opening. This offers the advantage that in a simple manner, the beverage of the first and the second ingredient can be obtained.

The apparatus according to the invention is characterized in that the apparatus is designed for supplying, during a first period, the liquid having, at most, a first temperature to the holder system, such that the liquid comes into contact with the first and the second ingredient for obtaining a first beverage part of the beverage which is dispensed via the at least one outflow opening, and for supplying, during a second period, the liquid having, at least, a second temperature to the holder system, such that the liquid comes into contact with the first and the second ingredient for obtaining a second beverage part of the beverage which is dispensed via the at least one outflow opening. This offers the advantage that dissolving and extracting can be separated in time, thereby substantially preventing the substance to be extracted from being extracted simultaneously with the dissolution of the substance to be dissolved.

With reference to embodiments represented in the drawing, albeit exclusively as a matter of non-limitative examples, the invention will presently be further elucidated. In the drawing.

In the Figures, corresponding parts are indicated with identical reference numerals.

Figure 1:
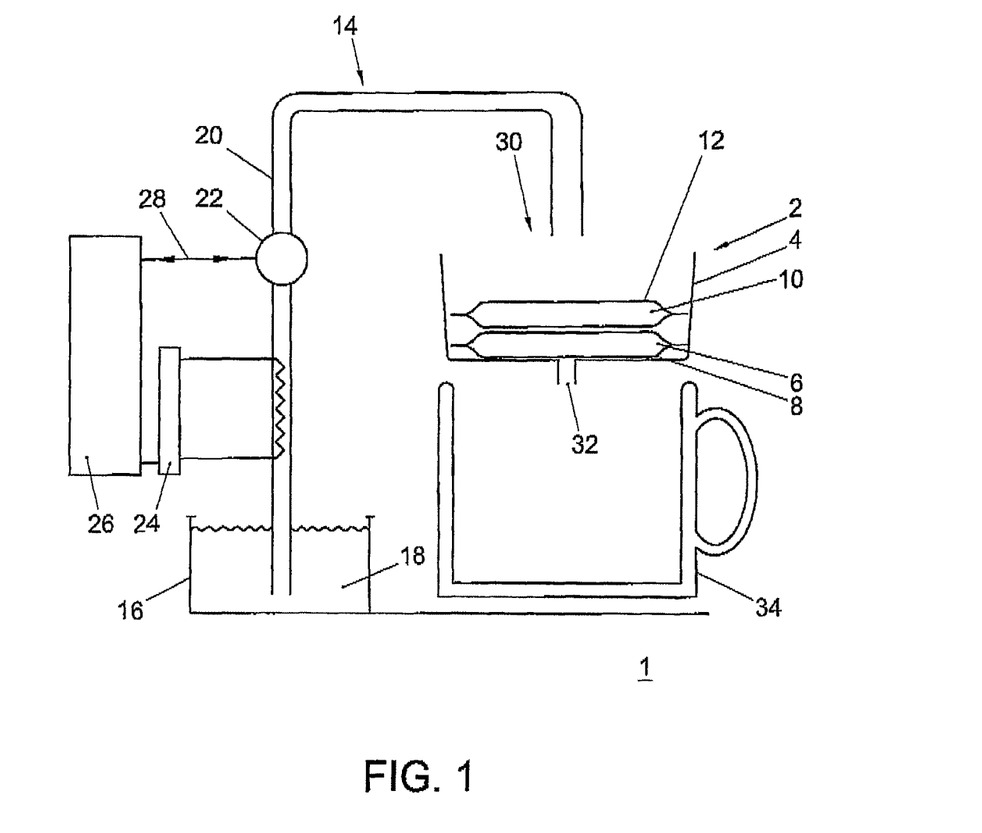
FIG. 1 shows a cross-section of a first embodiment of an apparatus according to the invention for carrying out a method according to the invention.

In FIG. 1, reference numeral 1 indicates an apparatus for preparing a beverage suitable for consumption according to the invention. The apparatus 1 is provided with a holder system 2, comprising a holder 4 in which a first ingredient 10 is included, comprising at least an amount of substance to be extracted and/or to be dissolved. In this example, the first ingredient 10 is included in a first pouch comprising a covering 12 of filtering paper.

In the holder 4, also, a second ingredient 6 is included comprising at least an amount of substance to be extracted and/or to be dissolved. In this example, the second ingredient 6 is included in a second pouch, comprising a covering 8 of filtering paper.

The apparatus 1 is further provided with liquid supply means 14 which, in this example, are provided with a liquid reservoir 16 in which a liquid 18 (in this example water) is included, and with a supply tube 20 through which, in use, the water can be transported from the reservoir 16 to the holder system 2. In this example, in the supply tube 20, a liquid pump 22 is included for pumping the water 18 from the reservoir 16 to the holder system 2.

The apparatus is further provided with a heating unit 24 for heating water flowing through the supply tube. Further, the apparatus is provided with a control device 26 for controlling the heating unit 24 and the pump 22.

The holder system 2, which is formed in this example by the holder 4, is provided with an inflow opening 30 and an outflow opening 32.

In use, the control unit 26 controls the heating unit 24 and the pump 22 such that during a first period, to the first and second ingredient, the water having, at most, a first temperature is supplied to the holder 4 for obtaining a first beverage part. The water that is supplied to the holder 4 will flow through the first and second pouch for obtaining the first beverage part which leaves the holder 4 via the outflow opening 32. The control device 26 also controls the heating unit 24 and the pump 22 such that during a second period, the water is supplied to the first and second ingredient with, at least, a second temperature for obtaining a second beverage part. The water that is supplied to the holder 4, and which has, at least, the second temperature will also flow through the first and second pouch to then flow in the form of the second beverage part, via the outflow opening 32 from the holder 4. Then, the first and second beverage parts are combined in a mug 34 placed under the holder 4 for obtaining the beverage. Here, it further applies that the first and second ingredient, and the first and second temperatures are selected such that during the first period, the first ingredient dissolves, or is or extracted to a greater or lesser extent than during the second period and/or that during the first period the second ingredient dissolves or is extracted to a greater or lesser extent than during the second period. The result is that the first and second beverage parts differ from each other.

This offers, for instance, the following possibilities. Suppose the first ingredient is provided with a product to be extracted such as ground coffee, and that the second ingredient is provided with a water-soluble substance such as a milk powder/creamer. Ground coffee has as a property that with a liquid such as water with a relatively low temperature, it can virtually not be extracted while, conversely, with a liquid such as water with a relatively high temperature, it can be extracted well. For milk powder/creamer it applies that it can be dissolved well in a liquid such as water at any temperature.

Therefore, in this example, the first temperature is selected such that during the first period, the first ingredient, comprising, in this example, the ground coffee, is at least virtually not extractable with the liquid (in this example water) and that the second temperature is selected such that during the second period the first ingredient is extractable with the liquid (in this example water). It further applies that the first temperature is selected such that at least during the first period, the second ingredient, in this example milk powder/creamer, is soluble in the liquid. This requirement is met in any case because, as stated, milk powder/creamer dissolves both at a relatively high and at a relatively low water temperature.

When, during the first period, the water having, at most, the first temperature is supplied to the holder, this water will first of all flow through the first pouch. When this water flows through the first pouch, as a result of the relatively low temperature of the water, the coffee in the first pouch will hardly be extracted, if at all. Then, the water flows from the first pouch 10, 12 to the second pouch 6, 8. The second ingredient, in this example milk powder/creamer, will then begin to dissolve. The water with the milk powder/creamer dissolved therein and, possibly, some, but relatively little coffee extract, leaves the second holder as the first beverage part. This first beverage part will then consist of milk, at least substantially. Then, during a second period, water having a temperature which is higher than the second temperature, is supplied to the holder. This water too will first flow through the first pouch. Because of the temperature of the water, the first ingredient will be extracted. The water with coffee particles therein, that is to say, coffee extract, leaves the first pouch and then flows through the second pouch. If, during the first period, the second ingredient has not completely dissolved, also during the second period, the second ingredient will dissolve in the coffee extract. The coffee extract with, optionally, a further, dissolved portion of the second ingredient, then leaves the holder 4 via the outflow opening 32 as the second beverage part. The second beverage part will then at least substantially consist of coffee extract. The first and the second beverage part will mix well together in the mug 34. By, presently, varying the length of the first and the second period relative to each other, the properties of the beverage in the holder 34 can be determined. If, for instance, the first period is relatively long, while the second period is relatively short, during the first period and, optionally also during the second period, relatively much of the second ingredient will be dissolved. However, during the first period, at least virtually no extraction of the ground coffee in the first pouch will take place. This will take place only during the relatively short second period. The result is that the second beverage consists of relatively little coffee extract with relatively much milk. When, thereupon, the second period is lengthened, the beverage will comprise relatively more coffee extract. Thus, by selecting the length of the first and second periods, the properties of the beverage can be determined.

Another special use of the apparatus and method according to the invention is the following. Suppose that, in addition to the milk/creamer, the second ingredient is further provided with a substance which generates froth when it is combined with a liquid (in this case water). The result is then that in the above-described example, during the first period, a first beverage part is obtained which consist, at least substantially, of milk with froth. This milk with froth will leave the outflow opening 32 and end up in the mug 34. Then, as described hereinabove, during the second period, the second beverage part that consists substantially of coffee extract will be generated. When the coffee extract ends up in the mug, the froth of the milk will float on the coffee extract. The result is that an attractive cappuccino is obtained. Further, the first and second temperature may be selected such that the beverage suitable for consumption has a predetermined temperature, preferably in the range of 30-100° C., more preferably in the range of 70-95° C., still more preferably in the range of 85-94° C. In this example, the first period precedes the second period and the first and second period link up directly. However, this is not required. It is also possible that there is an interval between the end of the first period and the beginning of the second period. During this interval, the pump can be switched off. It is however also possible that the pump remains switched on. The result is that during this third period, to the holder, a third beverage part is supplied whose properties will depend on the selected temperature of the water.

It is also possible that the second period precedes the first period. Therefore, in that case, first, water is supplied having a temperature which is higher than the second temperature. The result is that the ground coffee in the first pouch is extracted and that at least a part of the second ingredient dissolves during this second period. When, thereupon, during the first period, water having a temperature which is lower than the first temperature is supplied to the holder, at least virtually no coffee will be extracted in the first pouch while still a possible remainder of the second ingredient will dissolve in the second pouch. Here too, it will apply that the first and second beverage parts differ from each other while the properties of the first and second beverage part and hence the properties of the beverage depend on the length of the first and second period. These properties will also depend on the temperature eventually chosen of the water used during the first period and the second period.

In the above-described example, it therefore applies that the cold water has a temperature that is, at most, equal to the first temperature. The first temperature is such that the cold water is substantially not capable of extracting the coffee 10 in the holder system 2 so that the cold water, entering the holder system 2 via an inflow opening 30, flows through the covering 12 with ground coffee 10 and ends up in the covering 8 with the soluble substance 6, while substantially no coffee extract is formed. To this end, the temperature of the liquid is, at most, equal to the first temperature, which first temperature, to this end, is for instance in the range of 0-60° C., preferably in the range of 10-50° C., more preferably in the range of 15-40° C. The temperature of the water that is supplied to the first and the second ingredient in the holder 4 of the holder system 2 is here, for instance, in the range of 0-60° C., preferably in the range of 10-50° C., more preferably in the range of 15-40° C.

The temperature of the hot water which, during the second period, in this example after the heating element is switched on, is supplied to the first and second ingredient in the holder system 2, is at least equal to a second temperature which is such that in the holder 4, the hot water will extract the coffee 10 whereupon the coffee extract flows through the covering 8 and is dispensed via the outflow opening 32 to the cup 34. To this end, the second temperature is, for instance, in the range of 60-120° C., preferably in the range of 80-100° C., more preferably in the range of 90-97° C. The temperature of the water which is supplied to the first and the second ingredient in the holder 4 of the holder system 2 is, for instance, in the range of 60-120° C., preferably in the range of 80-100° C., more preferably in the range of 90-97° C. As the heating element needs some time to heat up, in this example, the temperature of the water will increase gradually. Also with a gradual increase of the temperature of the water, during the first period, the temperature of the water will, at most, be equal to the first temperature and, during the second period, the temperature of the water will, at least, be equal to the second temperature.

In the cup 34, the hot coffee extract is mixed with the cold milk so that coffee with milk is formed. A temperature of the coffee with milk will be between the temperature of the cold milk and the temperature of the hot coffee. In this example, the first and second temperature are such that temperature of the coffee with milk is favorable to such a beverage, for instance in the range of 30-100° C., preferably in the range of 70-95° C., more preferably in the range of 85-94° C. Here, the temperature and a first volume of the cold milk, and the temperature and a second volume of the hot coffee extract in the coffee with milk are taken into account. It is noted that in the covering, further, a stiffening body may be included as known from WO2004/018326.

It applies therefore in general that a method according to the invention comprises supplying, during at least a first period to the first and second ingredient a first part of the amount of liquid having, at most, a first temperature for obtaining a first beverage part, and supplying, during at least the second period, to the first and second ingredient a second part of the amount of liquid having, at least, a second temperature for obtaining a second beverage part.

It therefore applies, in general, for an apparatus according to the invention that the apparatus is designed for supplying, during at least a first period, a first part of the amount of liquid having, at most, a first temperature to the holder system so that the liquid comes into contact with the first and the second ingredient for obtaining a first beverage part of the beverage which is dispensed via the at least one outflow opening, and, supplying, during at least a second period, a second part of the amount of liquid having, at least, a second temperature to the holder system so that the liquid comes into contact with the first and second ingredient for obtaining a second beverage part of the beverage which is dispensed via the at least one outflow opening.

Figure 2:
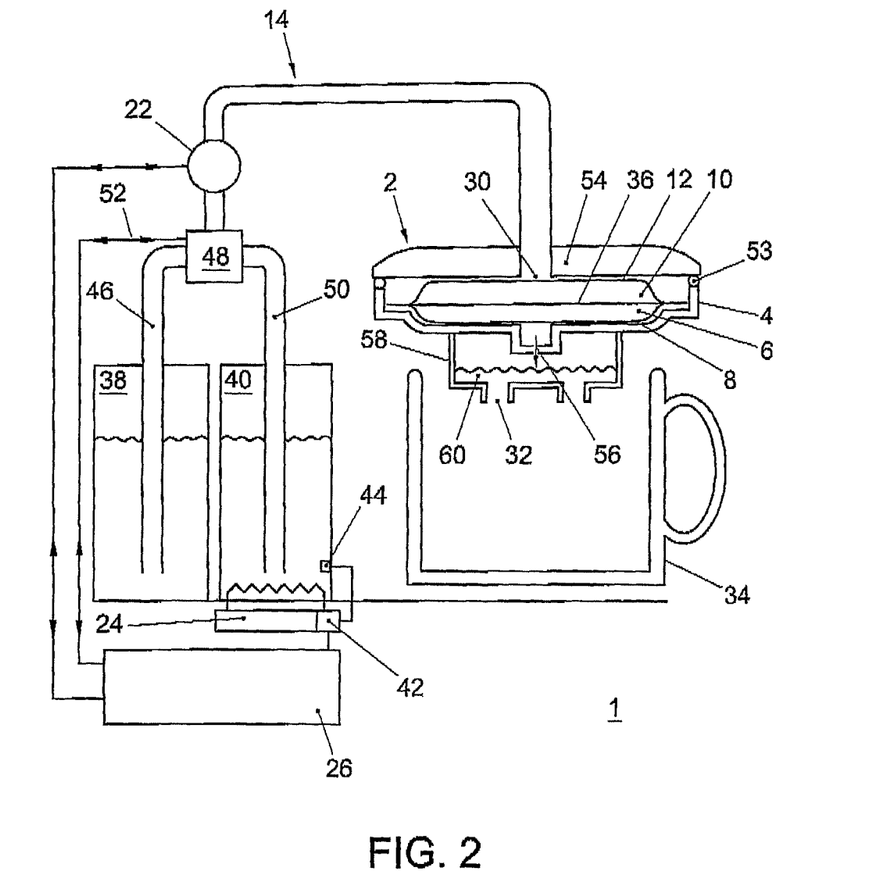
FIG. 2 shows a cross-section of a second embodiment of an apparatus according to the invention for carrying out a method according to the invention.

FIG. 2 shows an alternative embodiment of the apparatus 1 according to the invention. Here, parts corresponding to each other in FIGS. 1 and 2 are provided with the same reference numeral. Again, the apparatus in FIG. 2 is provided with a holder system 2 with a holder 4 in which is placed an amount of substance 10 to be extracted and an amount of a substance 6 soluble in a liquid such as water. In this example, the water-soluble substance is milk powder/creamer and the substance to be extracted is ground coffee. Other substances are also conceivable, as described in relation to FIG. 1. In this example, the milk powder 6 is included in a covering 8 of filtering paper, and the ground coffee 10 is included in a covering 12 of filtering paper. In this example, the coverings 8 and 12 are interconnected such that a milk powder 6 and the ground coffee 10 are separated from each other by a single layer of filtering material 36, for instance filtering paper.

In this example, the apparatus 1 is provided with a first liquid reservoir 38 for supplying to the holder system 2 water having, at most, the first temperature and a second liquid reservoir 40 for supplying to holder system water having, at least, the second temperature. To this end, the second reservoir 40 is provided with the heating unit 24. In this example, it is possible that a heating unit 24 is switched on continuously for keeping the water in the second reservoir 40 at an increased, second temperature. It is also possible that the heating unit 24 is further provided with a temperature regulating device 42 with which, with the aid of, for instance, a temperature detector 44, in a manner known per se, the temperature of the water in the second reservoir 40 is measured so that a temperature regulating device 42 can keep the temperature for instance constant on the basis of these measuring results. To this end, the heating device 24 can comprise a signal connection to the temperature detector 44.

In this example, the first reservoir 38 is in fluid communication via a first supply tube 46 with a valve 48. The second reservoir 40 is in fluid communication via a second supply tube 50 with the valve 48. The valve 48 is in fluid communication with the pump 22. The pump 22 is in fluid communication with the inflow opening 30 of the holder system 2. In use, the control device 26 can, for instance, control the valve 48 such that the fluid communication between the first reservoir 38 and the pump 22 is opened, and the fluid communication between the second reservoir 40 and the pump 22 is closed. To this end, the control device 26 can comprise a signal connection 52 with the valve or with a control of the valve. Then, during a first period, the control device 26 can control the pump 22, so that unheated, cold water is supplied from the first reservoir 38 via the first supply tube 46 to the holder system 2.

In this example, the holder system 2 is provided with a lid 54, so that during the first period, cold water can be supplied under pressure to the holder system 2. The temperature of the cold water is lower than or equal to the first temperature which is selected such that the cold water is substantially unable to extract the coffee 10 in the holder 4 so that cold water flows through covering 12 with ground coffee 10 and ends up through the layer of filtering material 36 in the covering 8 with the soluble substance 6, thereby forming substantially no coffee extract. The cold water however can dissolve the milk powder/creamer 6 in the holder so that a first beverage part in the form of unheated milk is formed. In this example, the holder system is further provided with a nozzle 56. The nozzle spouts a liquid jet in a buffer reservoir 58 where a layer 60 of liquid is formed before being dispensed via the outflow opening 32 to the cup 34. The nozzle and the buffer reservoir ensure that the dissolved milk is provided with a fine-bubble froth layer, as described in European patent application 0 878 158. It is also possible to create the fine-bubble froth layer in different manners or with alternative devices. Examples of these devices are described, inter alia, in European patent applications 1 317 199, where the liquid jets spouts into a buffer reservoir provided with a liquid flow decelerating barrier, and 1 317 200, where the liquid jet spouts onto a roughened surface, and in international patent application 2003/105642, where the liquid jet spouts onto a jet impact element with a top which is clear from an inside wall of a chamber in which the jet impact element is included. In addition, it is also possible to provide a soluble substance in the holder which, upon or after dissolution of the liquid, forms a froth layer (for instance self-frothing creamer).

After a predetermined time after the supply of the cold water to holder 2 has started, the temperature switching device 24 can control the valve 48 such that the fluid communication between the first reservoir 38 and the pump 22 is closed, and the fluid communication between the second reservoir 40 and the pump 22 is opened. The pump 22 may continue pumping, or hold still for some time, during switching of the valve 48. As the water in the second reservoir 40 is already heated, the temperature of the water supplied to holder 4 will change virtually instantaneously from, at most, the first temperature to, at least, the second temperature. Now, hot water is supplied, in this example under pressure, via the second supply tube 50 to the holder system 2. The temperature of the hot water is at least equal to the second temperature, which is selected such that in the holder, the hot water will extract the coffee 10. This coffee extract then flows through the second pouch. If the milk powder/creamer has not completely dissolved, with this, a further part will dissolve. After this, the coffee extract having, optionally, a further part of the milk powder/creamer dissolved therein, will be squirted via the nozzle 56 into the buffer reservoir 58. Here, the second beverage part is concerned which differs from the first beverage part. Thereupon, the hot coffee extract with a fine-bubble froth layer, also called café crème, will be dispensed to the cup 34. In the cup 34, the hot coffee extract is partly mixed with the cold frothed milk so that cappuccino is formed. The frothed milk tends to float on the coffee extract so that cappuccino is formed with an attractive white froth layer.

Note that in this example, the white froth layer can be formed in that the frothed milk, which is white, and the café crème, which has a brown colour, are formed at mutually differing moments, so that the white, frothed milk substantially does not mix with the café crème, but will float on the café crème. If, as is the case for instance in an apparatus known per se, in which water of only one temperature is supplied to the milk powder and the coffee in a holder, the milk powder and the coffee are dissolved or extracted, respectively, simultaneously, coffee with milk will be formed which is spouted by the nozzle 56 into the buffer reservoir 58, whereby frothed coffee with milk is formed, also called cappuccino, with a substantially brown froth layer. Cappuccino with the white froth layer may be appreciated more by connoisseurs than cappuccino with the brown froth layer.

In this example too, the temperature of the cappuccino will be between the temperature of the cold milk and the temperature of the hot coffee extract. The first and the second temperatures are, in this example, selected such that the temperature of the cappuccino is favorable to such a beverage, for instance in the range of 30-100° C., preferably in the range of 70-95° C., more preferably in the range of 85-94° C. Here are taken into account the temperature and a first volume of the cold milk and the temperature and a second volume of the hot coffee extract in the cappuccino.

Figure 3:
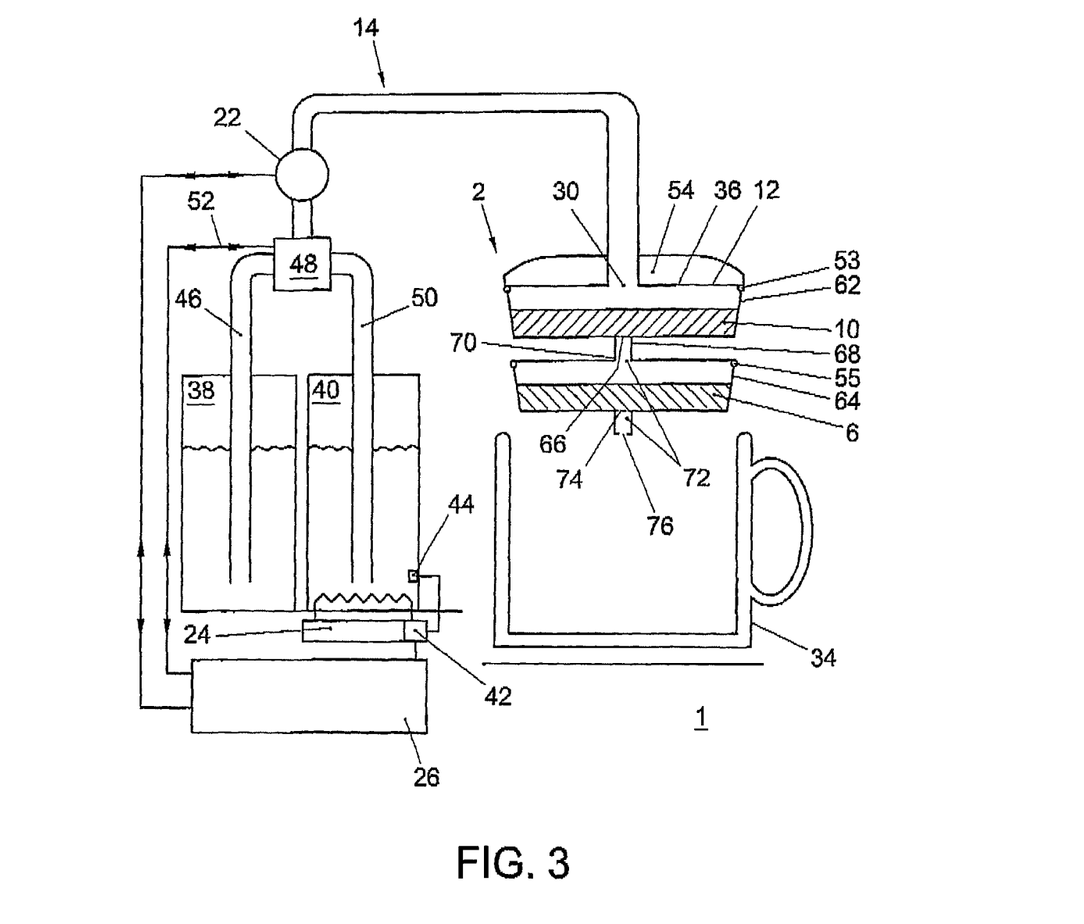
FIG. 3 shows a cross-section of a third embodiment of an apparatus according to the invention for carrying out a method according to the invention.

FIG. 3 shows an alternative embodiment of the apparatus according to the invention while parts corresponding to FIG. 2 are provided with the same reference numeral.

The apparatus in FIG. 3 is provided with a holder system 2 comprising a first holder 62 in which, in use, the amount of substance 10 to be extracted is included. The holder system is further provided with a second holder 64 in which, in use, the amount of substance 6 soluble in a liquid such as water is included. The first holder 62 is provided with an outflow opening 66 provided with a filter 68. The filter 68 has the property that the hot water, a solution or extract can pass the filter 68. However, the filter 68 forms a barrier to the first ingredient (the ground coffee) and, in this example also to the second ingredient in dry condition (the milk powder/creamer). The second holder 64 is closed off by a lid 70 which lid 70 is provided with an inflow opening 72. The inflow opening 72 is in fluid communication with the outflow opening 66. The second holder 64 is further provided with an outflow opening 72 provided with a filter 74. In this example, the filter 74 has the same properties as the filter 68. The outflow opening 72 is further in fluid communication with a nozzle 62.

For filling the second holder 64, the second holder can be removed from the lid 70. All this can be realized in a manner known per se. As a result, the second holder 64 can be filled with the second ingredient.

The first holder 62 can also be uncoupled from the lid 54. In this manner, the first holder 62 can be filled with the first ingredient. Then, the first holder is replaced so that the first holder is sealed off fluid-tightly by the lid 54. To this end, between the lid and the first holder, a sealing ring 53 known per se is present. Completely analogously, between the lid 70 and the second holder 64, a sealing ring 55 is present.

As discussed in relation to FIG. 2, in use, during the first period, water having a temperature which is lower than the first temperature is dispensed under pressure by the pump 22 to the holder system 2. First of all, this water flows under pressure through the first ingredient, that is, the ground coffee. During the first period at least virtually no coffee will be dissolved in the relatively cold water. In other words, at least virtually no extraction takes place. Then, the water flows via the outflow opening 66 under pressure into the second holder 64. In the second holder 64, the second ingredient, that is, in this example, the milk powder/creamer, will dissolve. The result is that the water with the dissolved second ingredient therein, that is, milk, flows under pressure from the outflow opening 72 of the second holder 64. Then, the thus formed milk, that is, the second beverage part, will be supplied to the nozzle 76. The nozzle 76 forms a jet of the second beverage part which, in this example, spouts directly into the mug 34. Upon impact of the jet of the second beverage part on the bottom of the mug and, some time later, upon impact thereof on a second beverage part already present in the mug 34, air will be whipped into the second beverage part. As a result, milk with a fine-bubble froth layer will be formed in the mug 34. In this example, the second period is selected such that at the end of the first period, at least the greater part of the second ingredient has dissolved. The control device 24 then ensures that at the end of the first period, the second period is started immediately. To this end, the valve 48 is switched so that the pump 22 begins pumping hot water from the reservoir 40. Then, this hot water is supplied under pressure via the conduit 14 to the first holder 62. This hot water is then pressed through the first ingredient, that is, the ground coffee. A coffee extract is then formed that leaves the first holder via the outflow opening 66 and then flows into the second holder 64. Subsequently, the coffee extract flows through the second holder whereby an optional remainder of the second ingredient can still dissolve. Then, coffee extract leaves the second holder via the outflow opening 72 as the second beverage part. The second beverage part too is supplied to the nozzle 76 so that a jet of the coffee extract is formed. This jet impacts on the milk with the fine-bubble froth layer already present. The result is that the froth layer of the milk floats on the mixture formed of milk and coffee extract. Thus, a cappuccino is formed with a fine-bubble froth layer.

Figure 5:
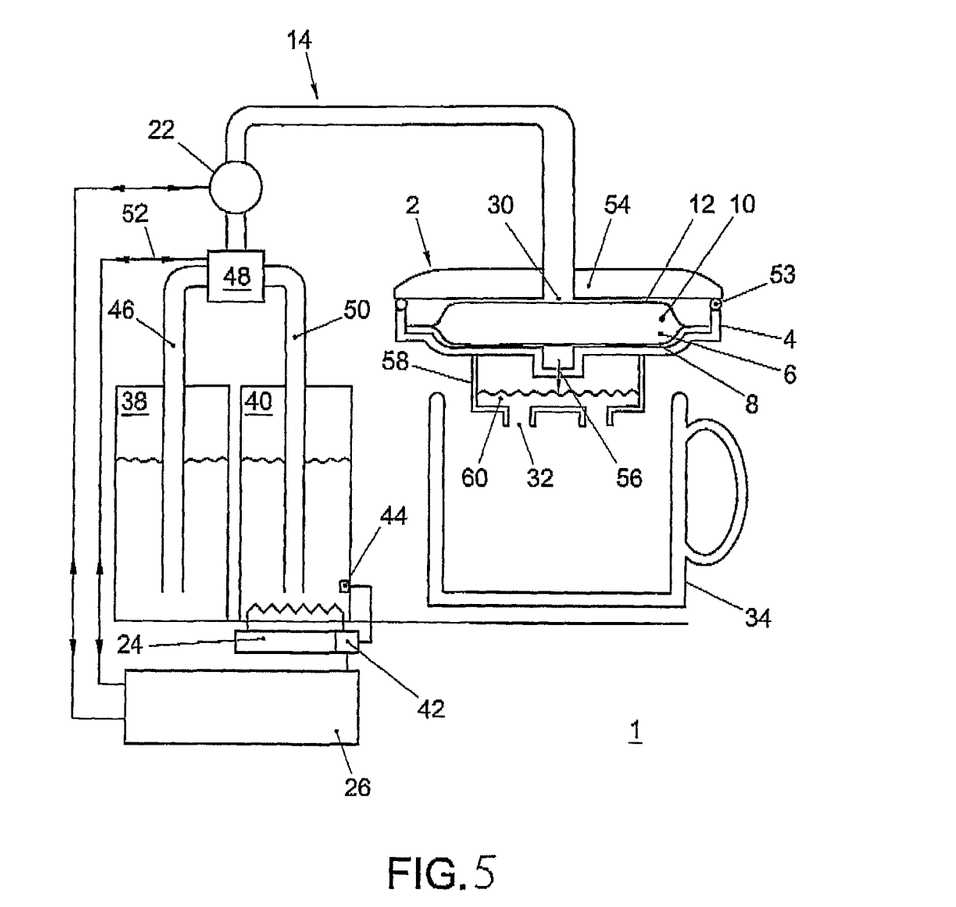
FIG. 5 shows a cross-section of a fourth embodiment of the apparatus accord to the invention.

It is noted that the outflow opening 74 of the second holder 64 can also be connected to a device for whipping in air as described in European patent application 1 371 311. Such variants are each understood to fall within the framework of the invention. It is further possible that the first ingredient is included in a first pouch 10, 12 as described with reference to FIG. 1. This first pouch can then be present in the first holder 62. Completely analogously, the second ingredient can be included in a second pouch 6, 8, which pouch is present in the second holder 62. Such variants are each understood to fall within the framework of the invention. The invention is not limited in any manner to the examples mentioned of the first and second ingredients. For instance, the first and the second ingredient can also, both, be included, for instance mixed, in one and the same pouch, as shown in FIG. 5, or in one and the same holder of the holder system. The second ingredient may also comprise further soluble substances such as flavourings, sugar and cocoa. The second ingredient too may comprise a product to be extracted. Completely analogously, the first ingredient can comprise other products to be extracted such as, for instance, tea. It is also conceivable that instead of products to be extracted, the first ingredient comprises soluble products. The first ingredient may also comprise a concentrate that can be dissolved for obtaining a first beverage part. The same applies for the second ingredient. Here, with the method according to the invention, the first and second ingredient have as a property that they differ from each other so that mutually different first and second beverage parts can be formed as set forth with reference to FIGS. 1, 2 and 3. For obtaining a liquid having a temperature that is lower than the first temperature or higher than the second temperature, respectively, the apparatus can also be provided with a cooling unit. For instance, water can be heated with the aid of the heating unit 26 for obtaining water having a temperature which is higher than the second temperature. The same water can be cooled again with the cooling unit for obtaining water having a temperature which is lower than the first temperature. Such variants too fall within the framework of the invention.

Figure 4A:
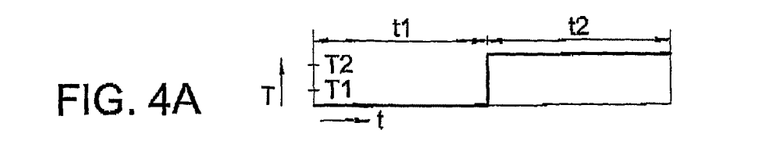
FIG. 4 shows a number of possible curves of the temperature of the liquid in time, with the apparatus according to FIG. 1, FIG. 2 or FIG. 3.
Figure 4B:
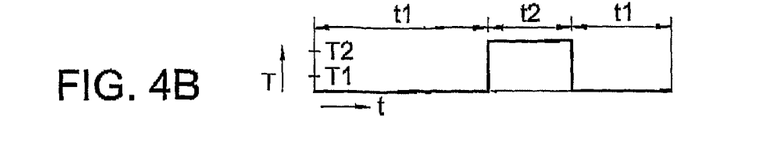
Figure 4C:
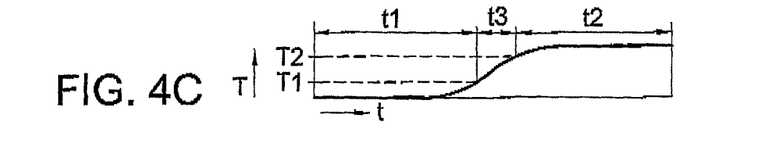
Figure 4D:
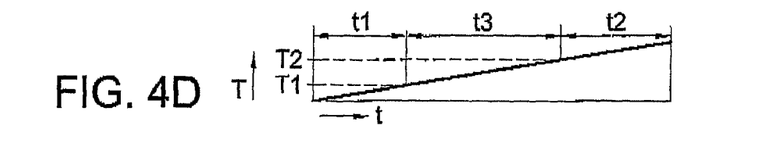

Finally, with reference to FIGS. 4a-4g, a possible temperature curve is represented of the liquid which is supplied to the holder according to FIGS. 1-3. Here, the first period is indicated with t1 and the second period with t2. The first temperature is indicated with T1 and the second temperature with T2. In this example, T1 is 40° C. and T2 is 60° C. In the example of FIG. 4a, it appears indeed that during the first period t1, the temperature is lower than T1 and that during the second period t2, the temperature is higher than T2. Further, the first period t1 and the second period t2 link up with each other. In the example of FIG. 4b, the second period is followed by a second first period. In the case of FIG. 4c, the temperature increases gradually and the first period t1 ends when the temperature is higher than the first temperature T1, and the second period t2 starts when the temperature rises above T2. In this example, the first period t1 and the second period t2 do not link up with each other. There is a third period t3 present between the first period t1 and the second period t2. Something similar applies completely analogously for the example of FIG. 4d in which the temperature proceeds linearly in time.

Figure 4E:
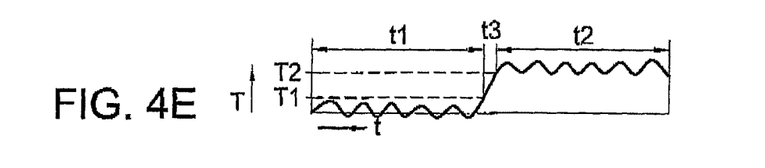
Figure 4F:
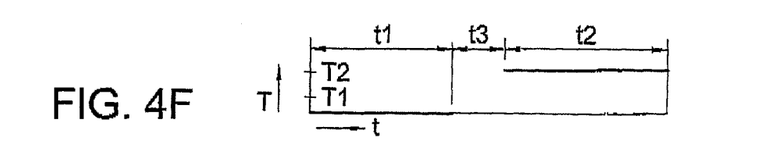
Figure 4G:
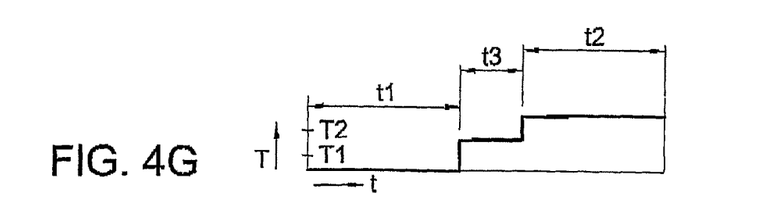

FIG. 4e shows that the temperature during the first period and during the second period can vary about an average. Here too, the first and the second period do not directly link up with each other. This also applies for the example of FIG. 4f and for the example of FIG. 4g. Such variants are all understood to fall within the framework of the invention.

The invention claimed is:

1. An apparatus for preparing a beverage suitable for consumption from at least two ingredients and an amount of liquid, which is supplied to the ingredients, wherein a first ingredient comprises a substance to be dissolved and a second ingredient comprises a substance to be extracted, the apparatus being provided with an at least one holder system for receiving and physically separating the first and the second ingredient, the holder system being provided with an at least one inflow opening and an at least one outflow opening and a liquid supply means configured for, during preparation of a single beverage, supplying a liquid from a first reservoir to the at least one inflow opening of the holder system, wherein the apparatus includes a control device for controlling the liquid supply means for supplying, during at least a first period, a first portion of the liquid having, at most, a maximum first temperature to the holder system so that the liquid comes into contact with the first and the second ingredient, the maximum first temperature predetermined so that, during the first period, the first ingredient is substantially dissolved but substantially none of the second ingredient is extracted, for obtaining a first beverage part of the beverage which is dispensed via the at least one outflow opening, and controlling the liquid supply means for supplying, during at least a second period, a second portion of the liquid having, at least, a minimum second temperature to the holder system so that the liquid comes into contact with the first and the second ingredient, the minimum second temperature being predetermined so that, during the second period, the second ingredient is extracted, for obtaining a second beverage part of the beverage which is dispensed via the at least one outflow opening.

2. The apparatus of claim 1 further comprising a first conduit disposed between the first reservoir and the holder system for transporting the liquid from the first reservoir to the at least one inflow opening of the holder system.

3. The apparatus of claim 1 further comprising an at least one heating device controlled by the control device for heating the liquid during at least one of the first and second period.

4. The apparatus of claim 3 further comprising a second reservoir, the liquid supply means configured to supply the liquid from the second reservoir to the at least one inflow opening of the holder system, the liquid having a first temperature and a second temperature.

5. The apparatus of claim 4 further comprising a second conduit disposed between the second reservoir and the holder system for transporting the liquid from the second reservoir to the at least one inflow opening of the holder system.

6. The apparatus of claim 1 further comprising an air-whip-in means in fluid communication with the outflow opening for whipping air into the beverage for obtaining the beverage with a fine-bubble froth layer.

7. The apparatus according to claim 1, wherein the first temperature is predetermined such that during the first period the soluble substance dissolves, at least partly, in the liquid and substantially no substance to be extracted is extracted.

8. The apparatus according to claim 1, wherein the second temperature is predetermined such that during the second period the substance to be extracted is extracted.

9. The apparatus according to claim 1, wherein the first temperature is predetermined to be lower than the second temperature.

10. The apparatus according to claim 1, wherein the temperature of the liquid which is supplied during the second period to the first and second ingredients is in the range of 80-100° C.

11. The apparatus according to claim 1, wherein the first ingredient is contained in a first pouch located upstream of the second ingredient contained in a second pouch.

12. The apparatus according to claim 1, wherein the liquid supply means are provided with one of at least one reservoir and at least one conduit for supplying the liquid to the at least one inflow opening.

13. The apparatus according to claim 10, wherein the liquid supply means are provided with one of a first reservoir and first conduit and one of a second reservoir and second conduit for supplying to the holder system the liquid having, at most, the first temperature and having, at least, the second temperature.

14. The apparatus according to claim 1, wherein the apparatus is further provided with air-whip-in means which are in fluid communication with the outflow opening for whipping air into the beverage for obtaining the beverage with a fine-bubble froth layer.

15. An apparatus for preparing a beverage, comprising:
an ingredient holder having an inflow opening and an outflow opening and configured to contain a first ingredient physically separate from a second ingredient;
a pump configured to supply a first volume of liquid and a second volume of liquid to the ingredient holder during a single beverage preparation cycle;
a temperature control unit in fluid communication with the pump for preparing the first volume of liquid to a first temperature and for preparing the second volume of liquid to a second temperature, the first temperature being predetermined such that the first volume of liquid substantially dissolves the first ingredient but does not extract the second ingredient, and the second temperature being predetermined such that the second volume of liquid extracts the second ingredient;
wherein the first volume of liquid flows into the inflow opening of the ingredient holder, forms a first beverage part comprised of the first volume of liquid and the first ingredient, and flows out of the outflow opening and into a vessel;
wherein the second volume of liquid flows into the inflow opening of the ingredient holder, forms a second beverage part comprised of the second volume of liquid and the extracted second ingredient, and flows out of the outflow opening and into the vessel;
wherein the first beverage part and the second beverage part combine in the vessel.

16. The apparatus of claim 15 further comprising a first pouch containing the first ingredient and a second pouch containing the second ingredient, the first pouch and the second pouch comprising a liquid permeable material and configured to be disposed within the ingredient holder.

17. The apparatus of claim 16, wherein the ingredient holder comprises a first compartment and a second compartment, the first pouch disposed within the first compartment and the second pouch disposed within the second compartment.

18. The apparatus of claim 17, wherein the first compartment is located above the second compartment.

19. An apparatus for preparing a beverage suitable for consumption from at least two ingredients and an amount of liquid, which is supplied to the ingredients, wherein a first ingredient comprises a substance to be dissolved and a second ingredient comprises a substance to be extracted, the apparatus being provided with an at least one holder system for receiving and physically separating the first and the second ingredient, the holder system being provided with an at least one inflow opening and an at least one outflow opening and a liquid supply means configured for, during preparing of a beverage, supplying a liquid from a first reservoir to the at least one inflow opening of the holder system, wherein the apparatus includes a control device for controlling the liquid supply means for supplying, during at least a first period, a first portion of the liquid having, at most, a maximum first temperature to the holder system so that the liquid comes into contact with the first and the second ingredient, the maximum first temperature predetermined so that, during the first period, the first ingredient is substantially dissolved but substantially none of the second ingredient is extracted, for obtaining a first beverage part of the beverage which is dispensed via the at least one outflow opening, and controlling the liquid supply means for supplying, during at least a second period, a second portion of the liquid having, at least, a minimum second temperature to the holder system so that the liquid comes into contact with the first and the second ingredient, the minimum second temperature being predetermined so that, during the second period, the second ingredient is extracted, for obtaining a second beverage part of the beverage which is dispensed via the at least one outflow opening, further comprising an at least one heating device controlled by the control device for heating the liquid during at least one of the first and second period, and a second reservoir, the liquid supply means configured to supply the liquid from the second reservoir to the at least one inflow opening of the holder system, the liquid having a first temperature and a second temperature.

20. The apparatus of claim 19, further comprising a first conduit disposed between the first reservoir and the holder system for transporting the liquid from the first reservoir to the at least one inflow opening of the holder system.

21. The apparatus of claim 19, further comprising a second conduit disposed between the second reservoir and the holder system for transporting the liquid from the second reservoir to the at least one inflow opening of the holder system.

* * * * *